United States Patent [19]

Nakamura et al.

[11] Patent Number: 5,574,789
[45] Date of Patent: Nov. 12, 1996

[54] ENCRYPTION COMMUNICATION METHOD AND TERMINAL DEVICE FOR ENCRYPTION COMMUNICATION

[75] Inventors: Mitsuhiro Nakamura; Koichi Shibata; Masakazu Oyama; Toshihiro Mori, all of Osaka, Japan

[73] Assignee: Mita Industrial Co., Ltd., Osaka, Japan

[21] Appl. No.: 341,205

[22] Filed: Dec. 5, 1994

[30] Foreign Application Priority Data

Dec. 7, 1993 [JP] Japan ................................. 5-306764

[51] Int. Cl.[6] ......................... H04L 9/16; H04N 1/44
[52] U.S. Cl. ................. 380/21; 380/18; 380/44; 380/49
[58] Field of Search ............. 380/21, 25, 18, 380/49, 44

[56] References Cited

U.S. PATENT DOCUMENTS

| | | | |
|---|---|---|---|
| 4,649,233 | 3/1987 | Bass et al. | 380/21 |
| 5,412,730 | 5/1995 | Jones | 380/21 X |
| 5,434,918 | 7/1995 | Kung et al. | 380/25 |

*Primary Examiner*—Gilberto Barron, Jr.
*Attorney, Agent, or Firm*—Antonelli, Terry, Stout & Kraus

[57] ABSTRACT

In a calling facsimile, if an operator sets an encryption communication mode, a random number sequence is generated by a random number generating section 15. A control section 11 produces an encryption key from the random number sequence, and transmits the random number sequence used for producing the encryption key to a telephone line 3 with the random number sequence included in NSS which is an option signal. At the same time, an encryption/decryption processing section 16 subjects information to be transmitted to encryption processing on the basis of the encryption key. The encrypted information is transmitted to the telephone line 3. On the other hand, in a called facsimile, the encryption key is reproduced on the basis of the random number sequence included in the NSS, and the received information is decrypted on the basis of the reproduced encryption key. Accordingly, the encryption key need not be determined in advance between a transmitter and a receiver. Further, the encryption key does not leak during transmission, thereby protecting the security of communication.

12 Claims, 6 Drawing Sheets

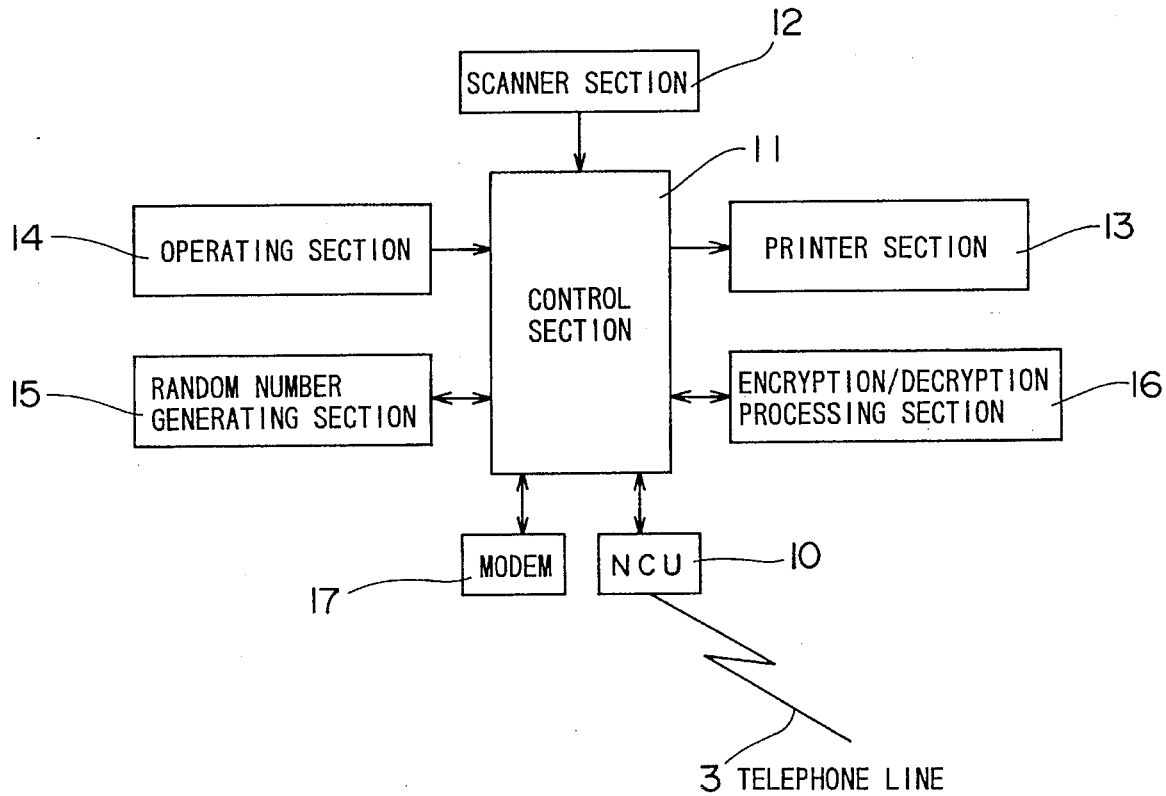

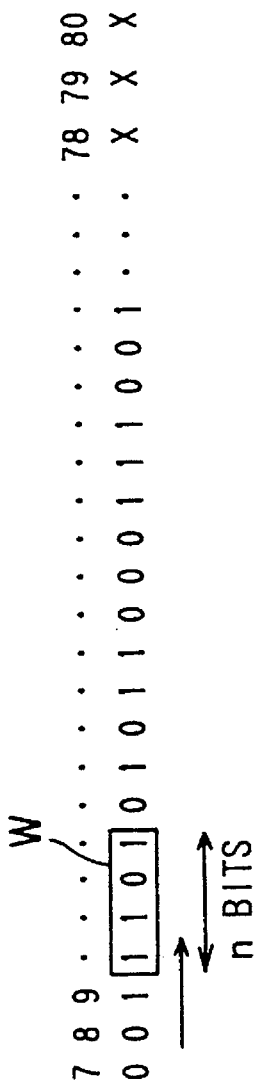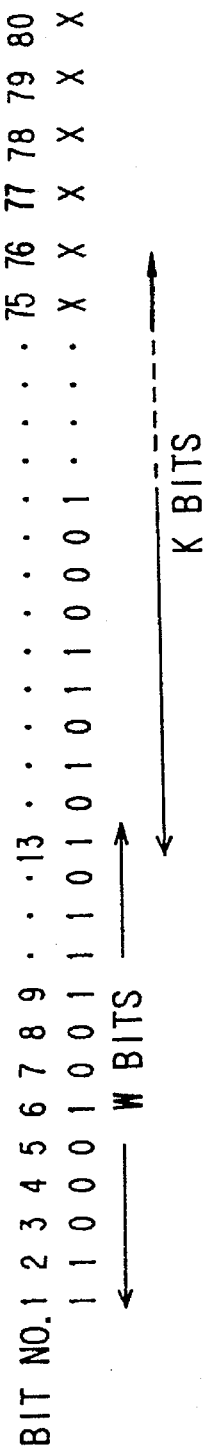

ENCRYPTION COMMUNICATION METHOD AND TERMINAL DEVICE FOR ENCRYPTION COMMUNICATION

BACKGROUND OF THE INVENTION

1. Field of the Invention

The present invention relates to an encryption communication method applied when encryption communication is established between a calling terminal device and a called terminal device, and to a terminal device for carrying out the encryption communication method.

2. Description of the Prior Art

In the field of communication, communication data has been conventionally subjected to encryption processing from the point of view of security protection of the communication data. For example, in facsimile communication for transmitting and receiving information corresponding to a document, the information which is communication data has been subjected to encryption processing so as to protect the security of the information.

The encryption processing of the information is performed on the basis of a so-called encryption key. Specifically, the information is subjected to a predetermined logical operation using the encryption key, thereby producing encrypted information entirely different from the original information. On the other hand, decryption processing for restoring the encrypted information into the original information is achieved by subjecting the encrypted information to a predetermined logical operation using the encryption key. The logical operation for the decryption processing is an operation opposite to the logical operation for the encryption processing.

The encryption processing and the decryption processing thus require a common encryption key. Therefore, a method in which an encryption key is previously determined between the transmission side and the receiving side of the encryption communication and the determined encryption key is previously registered in nonvolatile memories respectively provided in a terminal device on the transmission side and a terminal device on the receiving side has been conventionally adopted.

In the above described method, however, preparation work for establishing encryption communication is complicated because the encryption key must be determined in advance and registered in the nonvolatile memories.

Furthermore, when the encryption key stored in the nonvolatile memories disappears or is known by a third person for some reason, the above described preparation work must be performed again.

In order to solve the above described problems, therefore, it is considered that the encryption key itself is transmitted. In a case where the encryption key itself is transmitted, however, the danger of leakage of the contents of the communication to the third person is increased if the encryption key is monitored on the communication line.

SUMMARY OF THE INVENTION

An object of the present invention is to solve the above described technical problems and provide an encryption communication method requiring no complicated preparation work and ensuring the security of the contents of the communication.

Another object of the present invention is to provide a terminal device for carrying out the above described encryption communication method.

In accordance with an aspect, a calling terminal device according to the present invention comprises a random number generating section for generating a random number sequence, an encryption key producing section for producing an encryption key on the basis of the random number sequence generated by the random number generating section, an encrypting section for subjecting information to be transmitted to encryption processing on the basis of the encryption key produced by the encryption key producing section, and a transmitting section for transmitting to a communication line control information including the random number sequence used in producing the encryption key and the information subjected to the encryption processing by the encrypting section.

On the other hand, in accordance with an aspect, a called terminal device according to the present invention comprises an encryption key reproducing section for reproducing the encryption key on the basis of the random number sequence included in the control information transmitted from the calling terminal device through the communication line, and a decrypting section for subjecting the information received from the calling terminal device through the communication line to decryption processing on the basis of the encryption key reproduced by the encryption key reproducing section to restore the original information before the encryption.

According to the present invention, in the calling terminal device, the encryption key is produced on the basis of the random number sequence generated by the random number generating section, and the information to be transmitted is subjected to the encryption processing on the basis of the produced encryption key. The control information, including the random number sequence used in producing the encryption key, and the information subjected to the encryption processing are transmitted to the communication line. On the other hand, in the called terminal device, the encryption key is reproduced on the basis of the random number sequence included in the received control information. The received information is subjected to the decryption processing on the basis of the reproduced encryption key, to restore the decrypted original information.

Since the encryption key used in the case of the encryption in the calling terminal device is thus reproduced in the called terminal device, it is not necessary to previously determine the encryption key between a transmitter and a receiver and register the determined encryption key in nonvolatile memories. Accordingly, preparation work for encryption communication can be simplified.

Since the encryption key is produced on the basis of the random number sequence, the encryption key differs for each communication. Further, since not the encryption key itself, but the random number sequence used for producing the encryption key, is transmitted, the encryption key is not easily known by a third person. Accordingly, the security of communication can be kept high.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 (a), 4 (b) and 4 (c) are diagrams for explaining a method of producing an encryption in accordance with the present invention;

DESCRIPTION OF THE PREFERRED EMBODIMENTS

Figure 1:
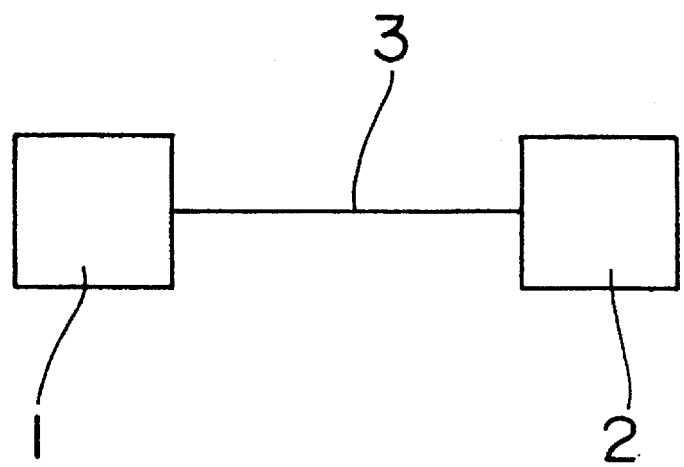
FIG. 1 is a conceptual diagram showing one example of an encryption communication system to which one embodiment of the present invention is applied.

FIG. 1 is a conceptual diagram showing one example of an encryption communication system to which one embodiment of the present invention is applied. The encryption communication system comprises a calling facsimile 1 for subjecting information corresponding to a document to be transmitted to encryption processing and transmitting the same and a called facsimile 2 for receiving the information encrypted and transmitted from the calling facsimile 1 and subjecting the same to decryption processing. The facsimiles 1 and 2 are connected to each other through a telephone line 3.

Figure 2:
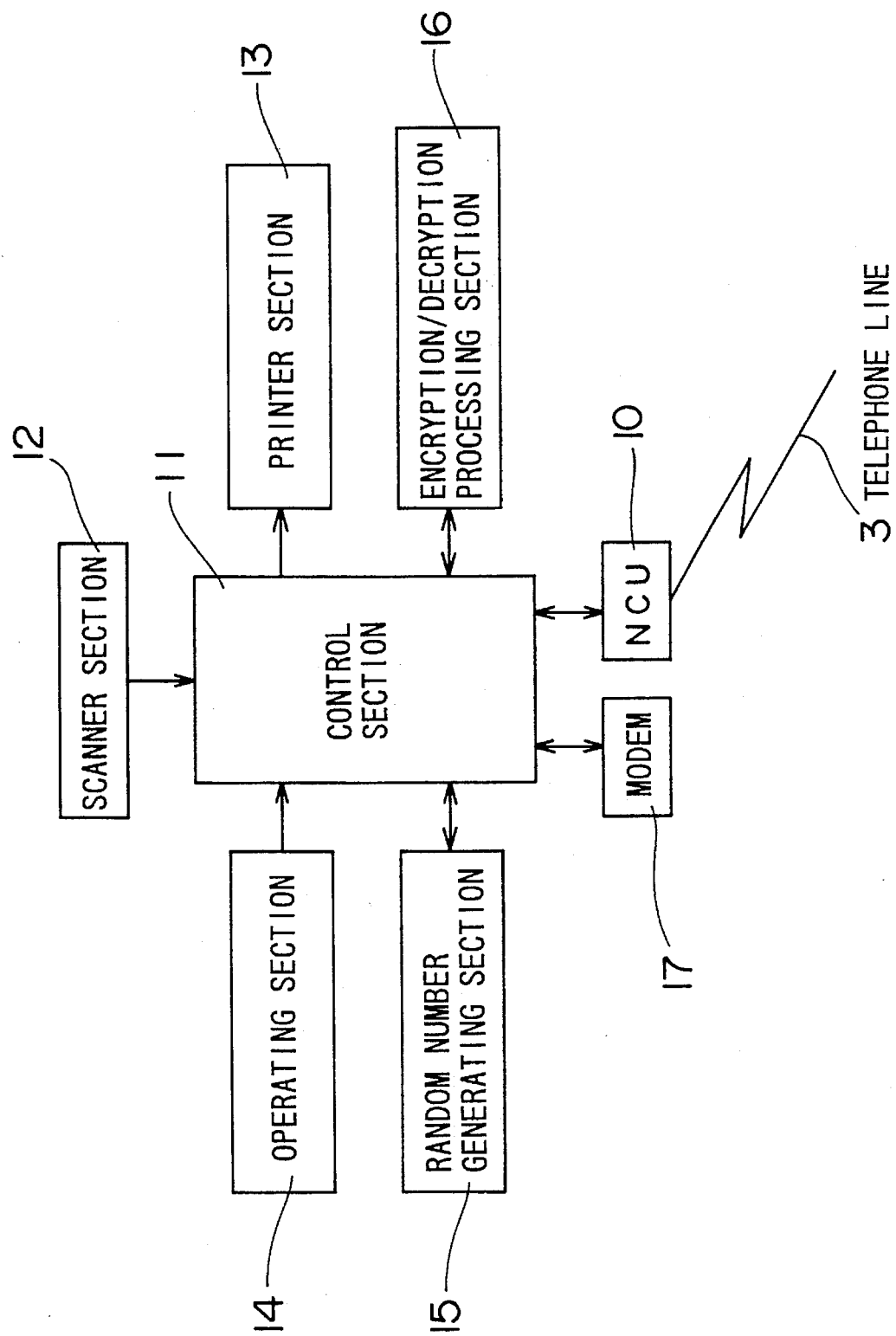
FIG. 2 is a block diagram showing the electrical construction of a facsimile applied to the encryption communication system shown in FIG. 1.

FIG. 2 is a block diagram showing the electrical construction of the above described facsimile. The facsimile is applied to both of the calling facsimile 1 and the called facsimile 2. The facsimile 1 comprises a control section 11 connected to the telephone line 3 through a network control unit (NCU) 10, a scanner section 12 for reading a document to be transmitted, and a printer section 13 for recording on paper information received through the telephone line 3. An operating section 14 capable of inputting various control information, a random number generating section 15 for generating a random number sequence, an encryption/decryption processing section 16 and a modem 17 are connected to the control section 11. The encryption/decryption processing section 16 encrypts the information to be transmitted and received encrypts the encrypted information to restore the original information.

The scanner section 12 includes an image sensor (not shown) for optically reading a document to generate information. The image sensor electrically scans the document in a predetermined direction of horizontal scanning. The document is conveyed in the direction of vertical scanning crossing the direction of horizontal scanning, thereby to achieve vertical scanning. The information outputted from the scanner section 12 is subjected to binary-coding processing and compression coding processing, after which the information is inputted to the control section 11.

The operating section 14 includes a start key, numerical keys, a mode setting key and the like. The mode setting key is a key for setting an operation mode of the facsimile. Examples of the operation mode include a normal mode for establishing normal facsimile communication and an encryption communication mode for establishing encryption communication.

Figure 3:
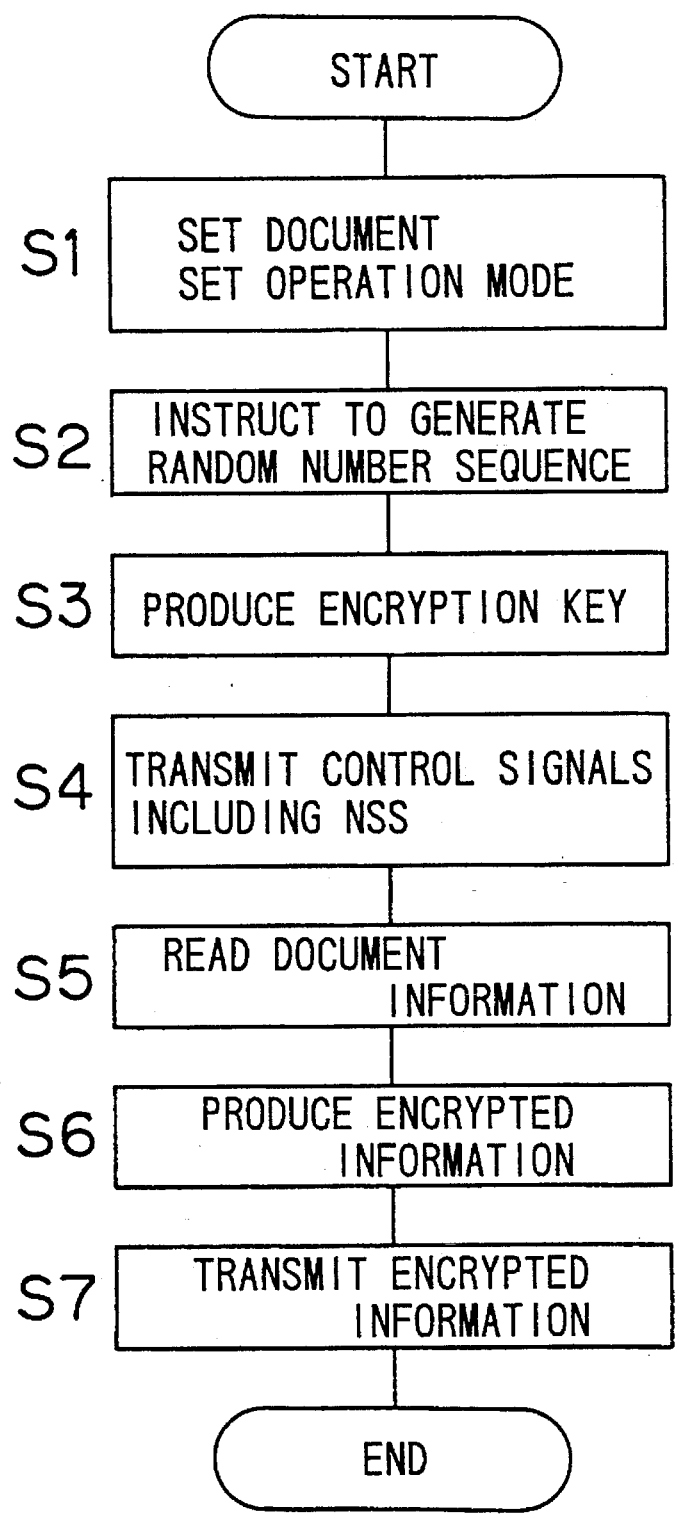
FIG. 3 is a flow chart showing operations of a calling facsimile in accordance with the present invention.

FIG. 3 is a flow chart showing operations of the calling facsimile 1. An operator sets a document to be transmitted in the scanner section 12 and operates the operating section 4 to set an operation mode (step S1). In the case of encryption communication, the operation mode is set to an encryption communication mode. The operator then operates the start key to start transmission. In response thereto, the control section 11 instructs the random number generating section 15 to generate a random number sequence (step S2). The random number sequence generated by the random number generating section 15 is applied to the control section 11. In the control section 11, an encryption key is produced on the basis of the random number sequence (step S3). The details of the production of the encryption key will be described later.

Furthermore, the control section 11 calls the called facsimile 2 in response to the start of transmission. If the called facsimile 2 answers, NSF (Non-Standard Facilities), which is a non-standard facilities identification signal including a code indicating that the called facsimile has an encryption communication function, is transmitted to the control section 11 of the calling facsimile 1 from the called facsimile 2. The control section 11 recognizes, if it receives the NSF, that the called facsimile 2 has an encryption communication function, and transmits to the telephone line 3 various control signals including NSS (Non-Standard Facilities Setup) which is a non-standard facilities set-up signal (step 4).

In the calling facsimile 1, the document is sequentially read page by page by the scanner section 12 at approximately the same time that the above described NSS is transmitted (step S5). If document information corresponding to one page is read, the information is applied to the encryption/decryption processing section 16. In the encryption/decryption processing section 16, the information is subjected to encryption processing, using the encryption key produced in the control section 11, to produce encrypted information (step S6). The encrypted information is applied to the control section 11. The control section 11 transmits the applied encrypted information to the telephone line 3 through the NCU 10 (step S7).

The NSS which is transmitted prior to the transmission of the encrypted information includes information representing an encryption communication mode and the random number sequence used for producing the encryption key. The called facsimile 2 reproduces the encryption key on the basis of the random number sequence included in the NSS and decrypts the encrypted information on the basis of the reproduced encryption key.

FIGS. 4 (a), 4 (b) and 4 (c) are diagrams for explaining a method of producing an encryption key. A random number sequence including binary data composed of predetermined R bits (for example, R =80) is generated by the random number generating section 15 (see FIG. 4 (a). In the control section 11, a binary data sequence corresponding to n bits (for example, n=4) from the m-th bit (for example, m=10), counted from the first bit in the random number sequence is taken out (see FIG. 4 (b). Here, m and n are predetermined constants. An ordinal number representation of the value represented by the binary data sequence taken out becomes a position "W" representing the position where an encryption key exists. A binary data sequence corresponding to predetermined K bits (for example, K=64) from the "W"-th bit, counted from the first bit in the random number sequence is taken out (see FIG. 4 (c). The binary data sequence taken out becomes an encryption key.

For example, if the binary data sequence taken out of the random number sequence as the position "W" is "1101", the position "W" becomes "13" in decimal representation. At this time, 64 bits from the 13-th bit to the 76-th bit becomes the encryption key.

The position "W" is thus determined on the basis of the random number sequence, and the encryption key is further produced on the basis of the position "W". Since the random number sequence takes a different value for each encryption communication, the encryption key and the position thereof in the random number sequence differ for each encryption communication.

In a case where the position "W" is composed of n bits, if the position "W" takes the maximum value "111 . . . 1"$(=2^n-1)$, the encryption key becomes a binary data sequence from the $(2^n-1)$-th bit to the $(2^n+K-2)$ $(=(2^n-1)+(K-1))$-th bit in the random number sequence. Consequently, the following relationship must be satisfied so as to reliably produce an encryption key composed of K bits:

$$2^n+K-2 \leq R$$

If the number of bits composing the random number sequence generated by the random number generating section 15 is set larger, it is possible to make the position where the encryption key exists more difficult to determine.

Figure 5:
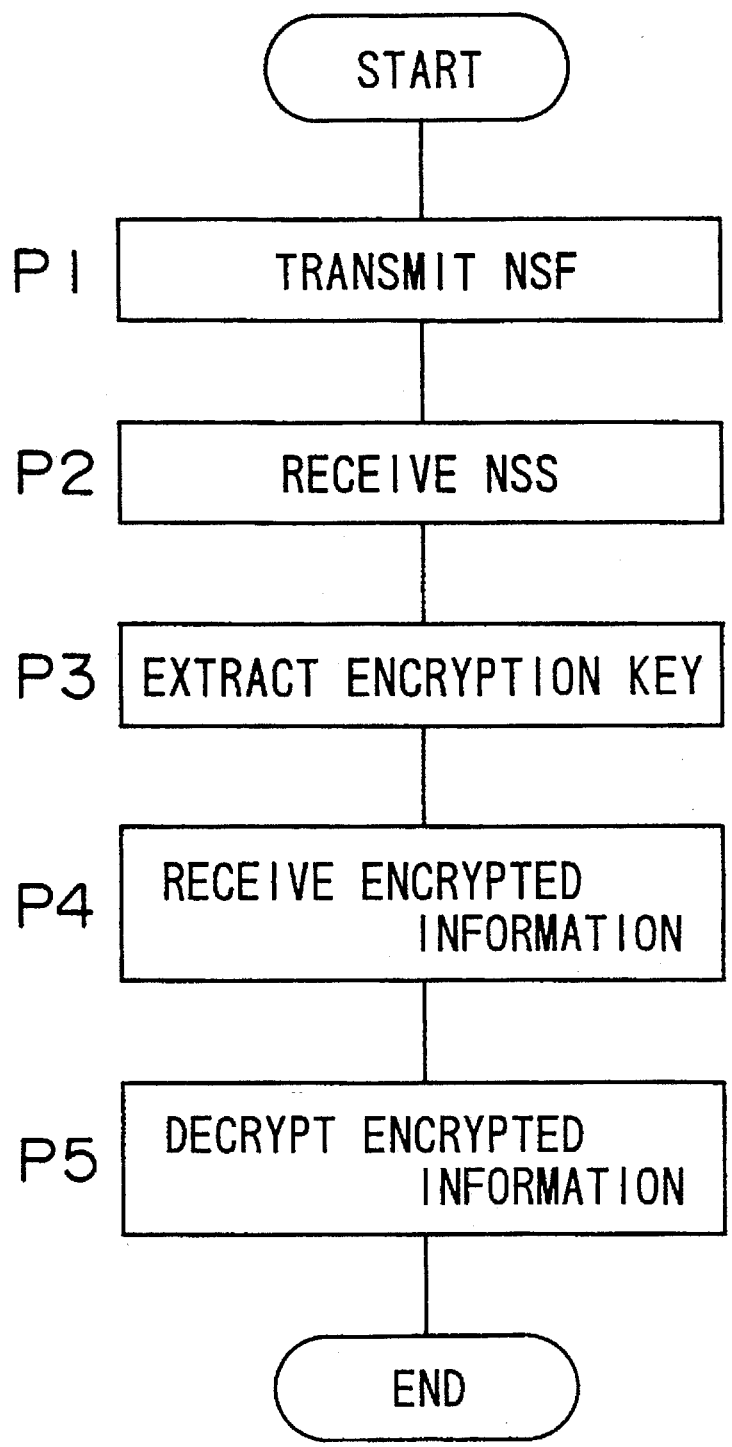
FIG. 5 is a flow chart showing operation of a called facsimile in accordance with the present invention.

FIG. 5 is a flow chart showing operation of the called facsimile 2. If the line is connected, the NSF is transmitted to the calling facsimile 1 (step P1). If the NSS is then received from the calling facsimile 1 (step P2), it is recognized that an encryption communication mode is set. When the encryption communication mode is set, the control section 11 reproduces an encryption key included in the NSS (step P3). Specifically, the control section 11 extracts as a position "W" a binary data sequence corresponding to n bits from the m-th bit, counted from the first bit in the random number sequence included in the NSS. A binary data sequence corresponding to K bits commencing with the "W"-th bit, counted from the first bit in the random number sequence, is taken out as the encryption key. Consequently, the encryption key can be reproduced. The reproduced encryption key is applied to the encryption/decryption processing section 16.

The control section 11 applies, if it receives the encrypted information from the calling facsimile 1 (step P4), the encrypted information to the encryption/decryption processing section 16. In the encryption/decryption processing section 16, the encrypted information is decrypted on the basis of the above described reproduced encryption key (step P5), to restore the original information. Thereafter, the document image received is recorded on paper on the basis of control carried out by the control section 11.

Figure 6:
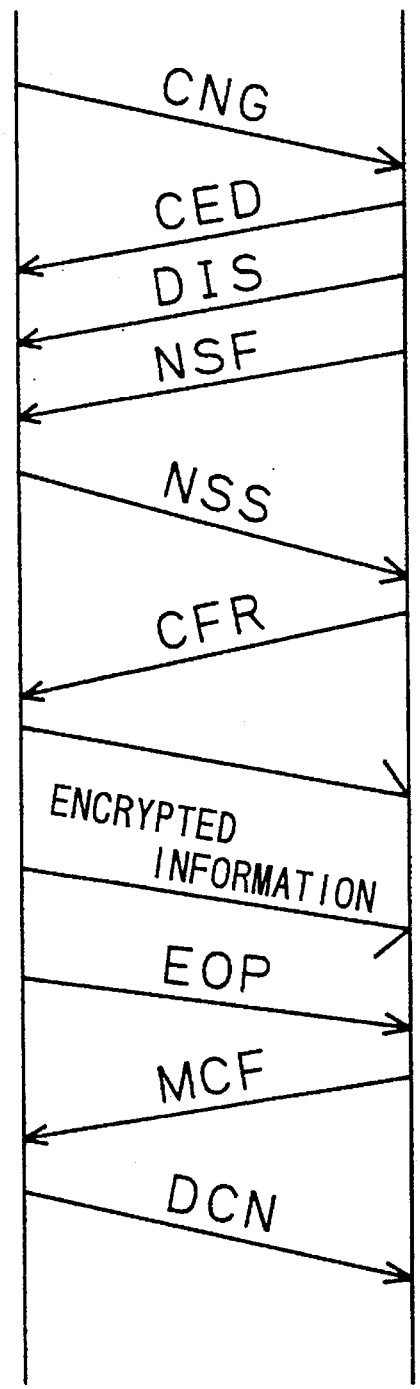
FIG. 6 is a signal sequence showing transmission and receiving of signals between the calling facsimile and the called facsimile in accordance to the present invention.

FIG. 6 is a signal sequence showing transmission and receiving of signals between the calling facsimile 1 and the called facsimile 2.

If the line is connected, CNG (Calling Tone) indicating that a calling facsimile is a voiceless terminal is transmitted from the calling facsimile 1. CED (Calling Station Identification) is transmitted in response to the CNG from the called facsimile 2, and DIS (Digital Identification Signal), including a code indicating that a called facsimile has a standard function, and NSF are further transmitted. The NSF is an option signal whose contents can be freely set by a maker of a facsimile. In the present embodiment, the NSF includes a code indicating that a called facsimile has an encryption communication function.

The calling facsimile 1 which received the DIS and the NSF, enabling it to recognize that the called facsimile 2 has an encryption communication function, transmits NSS. The NSS is also an option signal, similarly to the above described NSF. In the present embodiment, the NSS includes an identification code indicating whether or not an encryption communication mode is set in the calling facsimile 1 and the random number sequence used in producing the encryption key, as described above.

The called facsimile 2 transmits, if it is ready for receiving, CFR (Confirmation to Receive). The calling facsimile 1 which received the CFR transmits the encrypted information, and transmits EOP (End of Procedures), indicating that transmission is terminated, when it has transmitted all the encrypted information. MCF (Message Confirmation) indicating that receiving is confirmed is transmitted from the called facsimile 2 which received the EOP. DCN (Disconnect) indicating that a line is disconnected is transmitted from the calling facsimile 1 which received the MCF, to disconnect the line.

As described in the foregoing, in the facsimile according to the present embodiment, the random number sequence used for producing the encryption key is transmitted, whereby the encryption key need not be determined in advance and previously registered in nonvolatile memories. Consequently, preparation work for encryption communication is significantly decreased. Since the encryption key is produced on the basis of the random number sequence, the encryption key differs for each communication, and the position where the encryption key exists in the random number sequence differs for each communication. Consequently, it is extremely difficult for a third person to monitor the encryption key. Therefore, it is possible to ensure the security of the contents of communication.

Furthermore, in the present embodiment, the encryption key is included in the NSS which is an option signal. The type and the contents of the option signal are usually not available to the public. According to the present embodiment, therefore, it is possible to prevent the encryption key from leaking particularly effectively.

Although a description has been made of the present invention, the present invention is not limited to the above described embodiment. For example, in the present embodiment, the constants m and n required to determine the position "W" and the constant K required to determine the encryption key are predetermined. However, the constants n, m and K may be varied for each communication. In this case, however, the constants n, m and K, along with the random number sequence, must be transmitted to the called facsimile 2 so that the called facsimile 2 can recognize the position "W" to reproduce the encryption key.

Although in the above described embodiment, description was made by taking the facsimile as a terminal device, the present invention is also applicable to other terminal devices such as a personal computer and a word processor. Further, the present invention is also widely applicable to various terminal devices capable of establishing encryption communication.

Furthermore, the present invention is also applicable to a case where information other than the information taken as an example of information to be transmitted in the above described embodiment is transmitted.

Additionally, although in the above described embodiment, a part of the random number sequence is an encryption key, an encryption key may be produced/reproduced by subjecting a part of a random number sequence to a predetermined logical operation, for example. Specifically, the encryption key itself need not constitute a part of a random number sequence.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An encryption communication method for transmitting encrypted information from a calling terminal device to a called terminal device through a communication line, said method comprising the steps of:
   (a) generating at the calling terminal device a random number sequence;
   (b) producing at the calling terminal device an encryption key on the basis of the generated random number sequence;
   (c) subjecting information to be transmitted by the calling terminal device to encryption processing on the basis of the produced encryption key;
   (d) transmitting the encrypted information and control information from the calling terminal device, via the communication line, to the called terminal device, the control information including the random number sequence used in producing the encryption key;
   (e) receiving the encrypted information and the control information at the called terminal device;
   (f) reproducing at the called terminal device the encryption key on the basis of the random number sequence included in the received control information; and
   (g) decrypting the received encrypted information on the basis of the reproduced encryption key;
   wherein step (b) comprises:
      defining as a position key a binary data sequence corresponding to n bits of the generated random number sequence, commencing with the m-th bit counted from the first bit in the generated random number sequence; and
      defining as the encryption key a binary data sequence having a length of K bits and commencing with a bit at a bit position corresponding to an ordinal number representation of the position key, counted from the first bit in the generated random number sequence, where m, n, and K are integers.

2. The encryption communication method according to claim 1, wherein m, n and K are predetermined values.

3. The encryption communication method according to claim 1, wherein m, n and K are arbitrary values which vary for each transmission.

4. The encryption communication method according to claim 1, wherein the random number sequence includes R bits, where R is an integer, and $2^n + K - 2 \leq R$.

5. An encryption communication method for transmitting encrypted information from a calling terminal device to a called terminal device through a communication line, said method comprising the steps of:
   (a) generating at the calling terminal device a random number sequence;
   (b) producing at the calling terminal device an encryption key on the basis of the generated random number sequence;
   (c) subjecting information to be transmitted by the calling terminal device to encryption processing on the basis of the produced encryption key;
   (d) transmitting the encrypted information and control information from the calling terminal device, via the communication line, to the called terminal device, the control information including the random number sequence used in producing the encryption key;
   (e) receiving the encrypted information and the control information at the called terminal device;
   (f) reproducing at the called terminal device the encryption key on the basis of the random number sequence included in the received control information; and
   (g) decrypting the received encrypted information on the basis of the reproduced encryption key;
   wherein step (b) comprises:
      defining a position key composed of n bits from the random number sequence, and
      defining as the encryption key a binary data sequence having a length of K bits and commencing with a bit at a bit position corresponding to an ordinal number representation of the position key, counted from the first bit in the general random number sequence, where n and K are integers.

6. The encryption communication method according to claim 5, wherein n and K are predetermined values.

7. The encryption communication method according to claim 5, wherein n and K are arbitrary values which vary for each transmission.

8. The encryption communication method according to claim 5, wherein the random number sequence includes R bits, where R is an integer, and $2^n + K - 2 \leq R$.

9. A terminal device for transmitting encrypted information to a called terminal device connected thereto through a communication line, comprising:
   random number generating means for generating a random number sequence;
   encryption key producing means for producing an encryption key on the basis of the generated random number;
   encrypting means for subjecting information to be transmitted to encryption processing on the basis of the produced encryption key;
   transmitting means for transmitting the encrypted information and control information via the communication line to the called terminal device, the control information including the random number sequence used in producing the encryption key;
   wherein said encryption key producing means comprises:
      means for designating as a position key a binary data sequence corresponding to n bits of the generated random number sequence, commencing with the m-th bit counted from the first bit in the generated random number sequence and
      means for specifying as the encryption key a binary data sequence having a length of K bits and commencing with a bit at a bit position corresponding to an ordinal number representation of the position key, counted from the first bit in the generated random number sequence, where m, n and K are integers.

10. A terminal device for transmitting encrypted information to a called terminal device connected thereto through a communication line, comprising:
    random number generating means for generating a random number sequence;
    encryption key producing means for producing an encryption key on the basis of the generated random number;
    encrypting means for subjecting information to be transmitted to encryption processing on the basis of the produced encryption key;
    transmitting means for transmitting the encrypted information and control information via the communication line to the called terminal device, the control information including the random number sequence used in producing the encryption key;
    wherein said encryption key producing means comprises:
       means for designating a position key composed of n bits in the generated random number sequence; and
       means for specifying as the encryption key a binary data sequence having a length of K bits and commencing with a bit at a bit position corresponding to an ordinal-number representation of the position key, counted from the first bit in the generated random number sequence, where n and K are integers.

11. A terminal device for receiving from a calling terminal device connected thereto through a communication line information encrypted on the basis of an encryption key, produced using a random number sequence, and control information including the random number sequence, comprising:

encryption key reproducing means for reproducing the encryption key on the basis of a random number sequence included in control information received from the calling terminal device, and decrypting means for subjecting encrypted information received from the calling terminal device with the received control information to decryption processing on the basis of the reproduced encryption key to restore original information before the encryption;

wherein said encryption key reproducing means comprises:

means for extracting as a position key a binary data sequence corresponding to n bits of the received random number sequence commencing with the m-th bit counted from the first bit in the received random number sequence; and means for specifying as the encryption key a binary data sequence having a length of K bits and commencing with a bit at a bit position corresponding to an ordinal number representation of the position key, counted from the first bit in the received random number sequence, wherein m, n and K are integers.

12. A terminal device for receiving from a calling terminal device connected thereto through a communication line information encrypted on the basis of an encryption key, produced using a random number sequence, and control information including the random number sequence, comprising:

encryption key reproducing means for reproducing the encryption key on the basis of a random number sequence included in control information received from the calling terminal device, and decrypting means for subjecting encrypted information received from the calling terminal device with the received control information to decryption processing on the basis of the reproduced encryption key to restore original information before the encryption;

wherein said encryption key reproducing means comprises:

means for extracting a position key composed of n bits in the received random number sequence; and means for specifying as the encryption key a binary data sequence having a length of K bits and commencing with a bit at a bit position corresponding to an ordinal number representation of the position key, counted from the first bit in the received random number sequence, wherein n and K are integers.

* * * * *